(12) United States Patent
Fiengo et al.

(10) Patent No.: US 6,840,036 B2
(45) Date of Patent: Jan. 11, 2005

(54) CONTROL OF OXYGEN STORAGE IN A CATALYTIC CONVERTER

(75) Inventors: Giovanni Fiengo, Ercolano (IT); Jeffrey Arthur Cook, Dearborn, MI (US); Jessy W. Grizzle, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/231,850

(22) Filed: Aug. 30, 2002

(65) Prior Publication Data

US 2004/0040286 A1 Mar. 4, 2004

(51) Int. Cl.⁷ ................................................ F01N 3/00
(52) U.S. Cl. ....................... 60/285; 60/274; 60/276; 123/103; 123/109
(58) Field of Search ..................... 60/274, 276, 285, 60/286, 277; 701/103, 109

(56) References Cited

U.S. PATENT DOCUMENTS

| | | | | |
|---|---|---|---|---|
| 5,261,230 A | * | 11/1993 | Yuuki et al. .................. | 60/276 |
| 5,282,360 A | | 2/1994 | Hamburg et al. ............. | 60/274 |
| 5,357,753 A | * | 10/1994 | Wade .......................... | 60/274 |
| 5,375,415 A | | 12/1994 | Hamburg et al. ............. | 60/274 |
| 5,379,590 A | | 1/1995 | Hamburg et al. ............. | 60/276 |
| 5,383,333 A | | 1/1995 | Logothetis et al. ........... | 60/276 |
| 5,390,490 A | | 2/1995 | Brooks ........................ | 60/276 |
| 5,497,618 A | | 3/1996 | Brailsford et al. ............ | 60/274 |
| 5,499,500 A | | 3/1996 | Hamburg et al. ............. | 60/274 |
| 5,566,663 A | | 10/1996 | Hamburg et al. ........... | 123/679 |
| 5,598,703 A | | 2/1997 | Hamburg et al. ............. | 60/285 |
| 5,609,023 A | | 3/1997 | Katoh et al. .................. | 60/276 |
| 5,627,757 A | | 5/1997 | Comignaghi et al. . | 364/431.051 |
| 5,678,402 A | * | 10/1997 | Kitagawa et al. ............. | 60/276 |
| 5,839,274 A | | 11/1998 | Remboski et al. ............ | 60/274 |
| 5,842,339 A | * | 12/1998 | Bush et al. ................... | 60/274 |
| 5,848,528 A | | 12/1998 | Liu .............................. | 60/274 |
| 5,901,552 A | | 5/1999 | Schnaibel et al. ............ | 60/274 |
| 6,116,021 A | | 9/2000 | Schumacher et al. ......... | 60/274 |
| 6,138,452 A | * | 10/2000 | Davey et al. ................. | 60/274 |
| 6,253,542 B1 | | 7/2001 | Omara et al. ................. | 60/274 |
| 6,481,201 B2 | * | 11/2002 | Kako et al. .................. | 60/285 |
| 6,622,478 B2 | * | 9/2003 | Nakamura .................... | 60/285 |

OTHER PUBLICATIONS

"Dynamic Modeling of a Three–way Catalyst for SI Engine Exhaust Emission Control" by E.P. Brandt, Y. Wang and J.W. Grizzle, IEEE Transactions on Control System Technology, vol. 8, No. 5, Sep. 2000, pp. 767–776.

"On Board Diagnosis for Three–way Catalytic Converters" by G. Fiengo, L. Glielmo and S. Santini, International Journal of Robust and Nonlinear Control, vol. 11, No. 11, Sep. 2001.

Indirect Adaptive Control of Three–way Catalyst by E. Shafai, C. Roduner and H.P. Geering, SAE International Congress 1996. SAE Paper No. 961038.

* cited by examiner

Primary Examiner—Binh Q. Tran

(57) ABSTRACT

A system and method for controlling an engine to regulate the oxygen storage level in an emission control device are provided. The system includes oxygen sensors disposed in an exhaust gas stream of the engine upstream and downstream of the emission control device. The oxygen sensors generate a feedgas and tailpipe air fuel signals. The system includes an electronic control unit (ECU) configured to obtain an adjusted feedgas air fuel ratio responsive to the feedgas and tailpipe air fuel signals to correct bias in the feedgas air fuel signal. The (ECU) is further configured to obtain an estimate of an oxygen storage level in the emission control device responsive to the adjusted feedgas air fuel ratio and the tailpipe air fuel signal. Finally, the (ECU) is configured to generate a control signal for the engine responsive to the adjusted feedgas air fuel ratio and the oxygen storage level estimate.

51 Claims, 6 Drawing Sheets

CONTROL OF OXYGEN STORAGE IN A CATALYTIC CONVERTER

BACKGROUND OF THE INVENTION

1. Field of the Invention

This invention relates to engine control systems and, in particular, to a method and system for controlling an engine to maintain optimal oxygen storage levels in an emission control device.

2. Discussion of Related Art

Conventional vehicles typically employ an emission control device such as a three-way catalytic converter to control emissions resulting from the combustion process in an internal combustion engine. When a rich air fuel mixture is present during the combustion process, the emission control device oxidizes hydrocarbon (HC) and carbon monoxide (CO) emissions. When a lean air fuel mixture is present during the combustion process, the emission control device takes up oxygen from the exhaust gas to reduce nitrous oxide (NOx) emissions.

The emission control device is designed to store a finite amount of oxygen. If the maximum oxygen storage capacity of the device is attained during a lean transient of the engine a NOx breakthrough will occur. If there is too little oxygen in the device during a rich transient, a HC and CO breakthrough will occur. Accordingly, engine control systems are designed to control the engine directly, and emission control device indirectly, in order to achieve both maximum robustness and minimum emissions. The term "robustness" is used in the sense of a control system that is tolerant (insensitive) to the impact of air-fuel charge formation due to normal variations in variables whose inherent uncertainty affects the operation of the engine (e.g., measured quantities such as air flow, metered quantities such as fuel flow, environmental variables such as ambient humidity and/or air temperature and manufacturing tolerances such as a sensor time constraint). These goals can be achieved by controlling the engine so as to maintain the oxygen storage level in the emission control device at about 30% to about 70% of the maximum oxygen storage capacity. Within this range, high conversion efficiencies for both NOx emissions and HC and CO emissions are achieved.

Conventional engine control systems have attempted to achieve high conversion efficiencies for both NOx emission and HC and CO emissions using a feedback from an oxygen sensor located in the exhaust manifold of the engine upstream of the emission control device. This oxygen sensor, however, can provide erroneous signals regarding the engine air fuel mixture because of non-equilibrium effects in the exhaust gas. As a result, control systems have been developed that use a secondary oxygen sensor downstream of the emission control device to compensate for the error in the primary oxygen sensor. Use of the secondary oxygen sensor, however, presents its own problems. First, there is a relatively long time delay for the exhaust gas to travel from the engine to the secondary oxygen sensor. Second, when the oxygen storage level of the emission control device is at optimal levels for high conversion efficiencies of both NOx emissions and HC and CO emissions, the air fuel ratio determined by the secondary oxygen sensor is nearly stoichiometric regardless of the air fuel ratio detected by the primary oxygen sensor and the exact value of the oxygen storage level in the emission control device. In closed loop control systems, these characteristics can result in limit cycles in the commanded air fuel signals for the engine and, consequently, engine torque. Use of a secondary oxygen sensor, therefore, typically requires the control system to balance between emissions control and drivability.

In order to optimally manage the balance between emissions control and drivability, control systems have been developed that employ models of the emission control device to estimate the actual oxygen storage level in the emission control device. See, e.g., E. P. Brandt, et al. "Dynamic Modeling of a Three-way Catalyst for SI Engine Exhaust Emission Control," IEEE Transactions on Control System Technology, Vol. 8, No. 5 (2000), the entire disclosure of which is incorporated herein by reference. These conventional control systems, however, have several problems. First, the model of the emission control device typically uses the signal from the primary oxygen sensor. As discussed above, this signal is corrupted by a bias error that reduces the accuracy of the control system. Second, the models fail to account for variations in the observability of the oxygen storage level in the emission control device.

The inventors herein have recognized a need for a method and system for controlling an engine that will minimize and/or eliminate one or more of the above-identified deficiencies.

SUMMARY OF THE INVENTION

The present invention provides a method and a system for controlling an engine to maximize conversion efficiencies in an emission control device for both HC and CO emissions and NOx emissions.

A method in accordance with a first embodiment of the present invention includes the steps of receiving a feedgas air fuel signal from a first oxygen sensor disposed in an exhaust gas stream of the engine upstream of an emission control device and receiving a tailpipe air fuel signal from a second oxygen sensor disposed in the exhaust gas stream of the engine downstream of the emission control device. The method further includes the step of obtaining an adjusted feedgas air fuel ratio responsive to the feedgas air fuel signal and the tailpipe air fuel signal. In this manner, the method corrects the feedgas air fuel signal for the inherent bias in its measurement of the air fuel ratio. The method further includes the step of obtaining an estimate of an oxygen storage level in the emission control device responsive to the adjusted feedgas air fuel ratio and the tailpipe air fuel signal. Finally, the method includes the step of generating a control signal for the engine responsive to the adjusted feedgas air fuel ratio and the oxygen storage level estimate for the first emission control device.

A system in accordance with the first embodiment of the present invention includes first and second oxygen sensors. The first oxygen sensor is disposed in an exhaust gas stream of the engine upstream of an emission control device and generates a feedgas air fuel signal. The second oxygen sensor is disposed in the exhaust gas stream of the engine downstream of the first emission control device and generates a tailpipe air fuel signal. The system also includes an electronic control unit configured to obtain an adjusted feedgas air fuel ratio responsive to the feedgas air fuel signal and the first tailpipe air fuel signal, to obtain an estimate of an oxygen storage level in the emission control device responsive to the adjusted feedgas air fuel ratio and the tailpipe air fuel signal, and to generate a control signal for the engine responsive to the adjusted feedgas air fuel ratio and the oxygen storage level estimate for the emission control device.

A method in accordance with another embodiment of the present invention may include the step of receiving a feedgas air fuel signal from a first oxygen sensor disposed in an exhaust gas stream of the engine upstream of a first emission control device. The method may further include the steps of receiving a first tailpipe air fuel signal from a second oxygen sensor disposed in the exhaust gas stream of the engine downstream of the first emission control device and receiving a second tailpipe air fuel signal from a third oxygen sensor disposed in the exhaust gas stream of the engine downstream of a second emission control device wherein the second emission control device is downstream of the first emission control device. The method may further include the step of obtaining an adjusted feedgas air fuel ratio responsive to the feedgas air fuel signal and the first tailpipe air fuel signal. The method further includes the steps of obtaining an estimate of an oxygen storage level in the first emission control device responsive to the adjusted feedgas air fuel ratio and the first tailpipe air fuel signal and obtaining an estimate of an oxygen storage level in the second emission control device responsive to the first tailpipe air fuel signal and the second tailpipe air fuel signal. Finally, the method includes the step of generating a control signal for the engine responsive to the adjusted feedgas air fuel ratio and one of the oxygen storage level estimate for the first emission control device and the oxygen storage level estimate for said second emission control device. A method in accordance with the second embodiment of the invention allows control of one of two serially aligned emission control devices in the exhaust gas stream.

A system in accordance with the second embodiment of the present invention includes first, second, and third oxygen sensors. The first oxygen sensor is disposed in an exhaust gas stream of the engine upstream of a first emission control device and generates a feedgas air fuel signal. The second oxygen sensor is disposed in the exhaust gas stream of the engine downstream of the first emission control device and generates a first tailpipe air fuel signal. The third oxygen sensor is disposed in the exhaust gas stream of the engine downstream of a second emission control device, wherein the second emission control device is downstream of the first emission control device, and generates a second tailpipe air fuel signal. The system further includes an electronic control unit configured to obtain an adjusted feedgas air fuel ratio responsive to the feedgas air fuel signal and the first tailpipe air fuel signal. The electronic control unit is further configured to obtain an estimate of an oxygen storage level in the first emission control device responsive to the adjusted feedgas air fuel ratio and the first tailpipe air fuel signal and to obtain an estimate of an oxygen storage level in the second emission control device responsive to the first tailpipe air fuel signal and the second tailpipe air fuel signal. Finally, the electronic control unit is configured to generate a control signal for the engine responsive to the adjusted feedgas air fuel ratio and one of the oxygen storage level estimate for the first emission control device and the oxygen storage level estimate for the second emission control device.

A system and method in accordance with the present invention is advantageous as compared to conventional systems and methods for controlling engines. The inventive system and method adjust the air fuel ratio indicated by the feedgas air fuel signal to account for the bias error typically found in the signal. As a result, the closed-loop feedback control system for the engine is more accurate. Accuracy is further enhanced through the use of the adjusted feedgas air fuel ratio in estimating the oxygen storage level of the emission control device. Finally, the inventive system and method enable more accurate estimation of the oxygen storage level by evaluating the estimate in view of the engine operating conditions and the resulting observability of the emission control device.

These and other advantages of this invention will become apparent to one skilled in the art from the following detailed description and the accompanying drawings illustrating features of this invention by way of example.

BRIEF DESCRIPTION OF THE DRAWINGS

FIG. 9 is a block diagram illustrating a system and method for controlling an engine in accordance with a third embodiment of the present invention. (Y-connection, serial)

Figure 11:
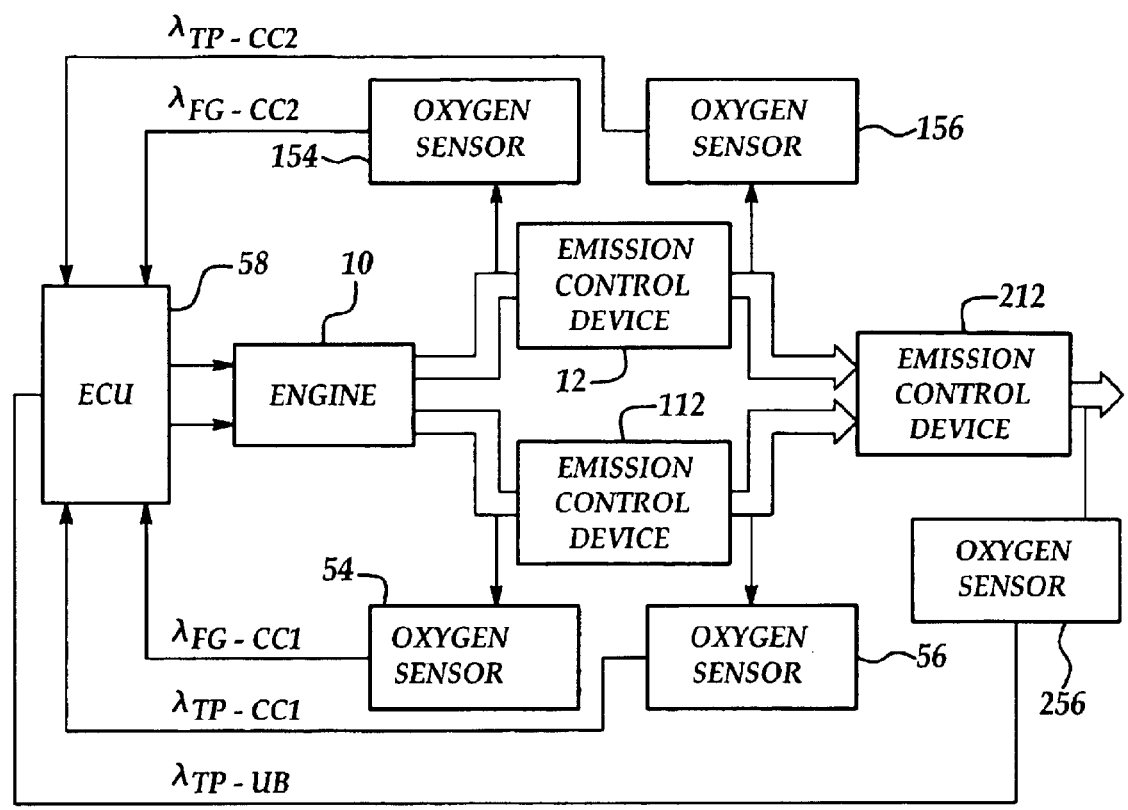

Alternative embodiments (series TWCs FIG. 11 and page 27 (series) and page 31 (parallel))

Alternative embodiments (Y page 35, 42)

DETAILED DESCRIPTION OF EMBODIMENTS OF THE INVENTION

Figure 1:
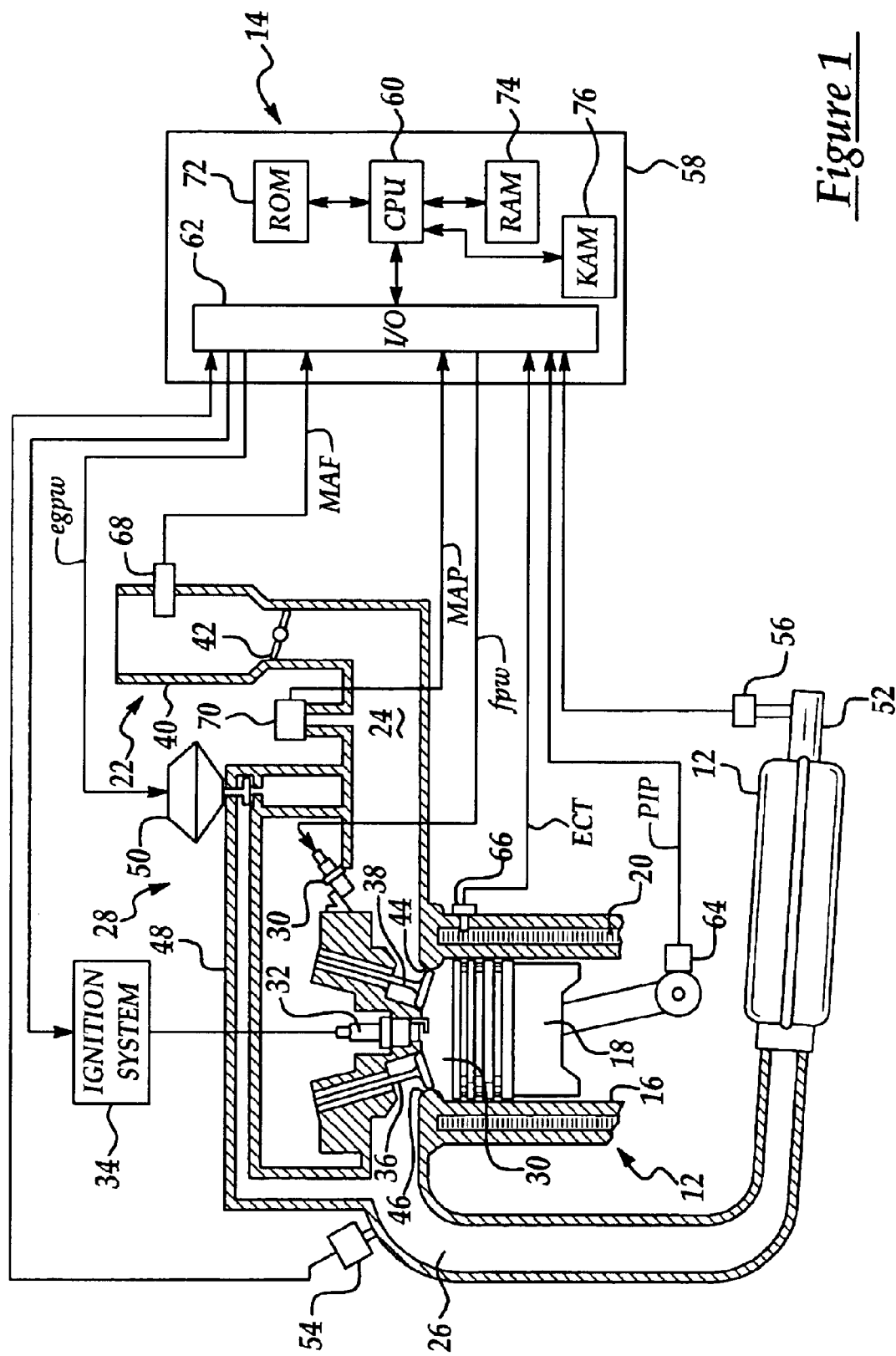
FIG. 1 is a schematic diagram illustrating an internal combustion engine incorporating a system for controlling the engine in accordance with a first embodiment of the present invention.

Referring now to the drawings wherein like reference numerals are used to identify identical components in the various views, FIG. 1 illustrates an internal combustion engine 10, an emission control device 12, and a system 14 in accordance with the present invention for controlling engine 10 in order to maintain an optimal oxygen storage level in device 12. By maintaining an optimal oxygen storage level in device 12, maximum engine robustness and minimum emissions are obtained.

Engine 10 is designed for use in a motor vehicle. It should be understood, however, that engine 10 may be used in a wide variety of applications. Engine 10 provides motive energy to a motor vehicle or other device and is conventional in the art. Engine 10 may define a plurality of combustion chambers or cylinders 16 and may also include a plurality of pistons 18, coolant passages 20, a throttle assembly 22, an intake manifold 24, an exhaust manifold 26, and engine gas recirculation (EGR) system 28, fuel injectors 30, spark plugs 32, an ignition system 34, intake valves 36, and exhaust valves 38.

Cylinders 16 provide a space for combustion of an air/fuel mixture to occur and are conventional in the art. In the illustrated embodiment, only one cylinder 16 is shown. It will be understood, however, that engine 10 may define a plurality of cylinders 16 and that the number of cylinders 16 may be varied without departing from the spirit of the present invention.

Pistons 18 are coupled to a crankshaft (not shown) and drive the crankshaft responsive to an expansion force of the air fuel mixture in cylinders 18 during combustion. Pistons 18 are conventional in the art and a piston 18 may be disposed in each cylinder 16.

Coolant passages 20 provide a means for routing a heat transfer medium, such as a conventional engine coolant, through engine 10 to transfer heat from cylinders 16 to a location external to engine 10. Passages 20 are conventional in the art.

Throttle assembly 22 controls the amount of air delivered to intake manifold 24 and cylinders 16. Assembly 22 is conventional in the art and may include a throttle body 40 and a throttle plate 42 disposed therein for regulating the amount of airflow through body 40 to manifold 24. It should be understood that assembly 22 may be electronically controlled.

Intake manifold 24 provides a means for delivering charged air to cylinders 16. Manifold 24 is conventional in the art. An inlet port 44 is disposed between manifold 24 and each cylinder 16.

Exhaust manifold 26 is provided to vent exhaust gases from cylinders 16 after each combustion event. Manifold 26 is also conventional in the art and delivers exhaust gases to device 12. An exhaust port 46 is disposed between manifold 26 and each cylinder 16.

EGR system 28 is provided to return a portion of the exhaust gases to cylinders 16 in order to reduce emissions of combustion by-products. EGR system 28 includes a passage 48 that extends from exhaust manifold 26 to intake manifold 24 and an EGR valve 50 that may be disposed within passage 48 to control the delivery of recirculated exhaust gases to intake manifold 24.

Fuel injectors 30 are provided to deliver fuel in controlled amounts to cylinders 16 and are conventional in the art. Although only one fuel injector 30 is shown in the illustrated embodiment, it will again be understood that engine 10 will include additional fuel injectors for delivering fuel to other cylinders 16 in engine 10.

Spark plugs 32 are provided to ignite the air/fuel mixture in cylinders 16. Spark plugs 32 are also conventional in the art. Although only one spark plug is shown in the illustrated embodiment, it should be understood that each cylinder 16 will include at least one spark plug 32.

Ignition system 34 delivers electrical current to spark plugs 32. System 34 is conventional in the art may comprise a solid-state ignition system (i.e., a distributor-less system).

Intake valves 36 open and close each intake port 44 to control the delivery of air to the respective cylinder 16. Intake valves 36 are conventional in the art. Although only one intake valve 36 is shown in the illustrated embodiment, it should be understood that multiple intake valves 36 may be used for each cylinder 16.

Exhaust valves 38 open and close each exhaust port 46 to control the venting of exhaust gases from the respective cylinder 16 and are also conventional in the art. Again, although only one exhaust valve 38 is shown in the illustrated embodiment, it should be understood that multiple exhaust valves 38 may be used for each cylinder 16.

Device 12 is provided to reduce emissions of hydrocarbons (HC), carbon monoxide (CO) and nitrous oxides (NOx) resulting from the combustion process in cylinders 16 of engine 10. Device 12 is conventional in the art and may comprise a three-way catalytic converter. Device 12 is coupled to exhaust manifold 26 and receives exhaust gas from cylinders 16 through manifold 26. Device 12 oxidizes HC and CO emissions and takes up oxygen from NOx emissions. The byproducts of this process exit device through another manifold or tailpipe 52.

System 14 is provided to control engine 10. In particular, system 14 controls fuel delivery to cylinders 16 of engine 10 through injectors 30 in order to maintain the oxygen storage level in device 12 at an optimal level. System 14 may include exhaust gas oxygen sensors 54, 56 and an electronic control unit (ECU) 58.

Oxygen sensors 54, 56 are provided to generate signals indicative of the amount of oxygen present in the exhaust gas and, therefore, the air fuel mixture in cylinders 16 of engine 10 during a combustion event. Sensors 54, 56 are conventional in the art and may comprise linear sensors (generally referred to as universal exhaust gas oxygen sensors or UEGO sensors) or non-linear or switching sensors (generally referred to as heated exhaust gas oxygen sensors or HEGO sensors) or some combination of the two. Oxygen sensor 54 is disposed in the exhaust gas stream of engine 10 in exhaust manifold 26 upstream of device 12 and generates a "feedgas" air fuel signal $\lambda_{FG\text{-}CC1}$. Oxygen sensor 56 is disposed in manifold or tailpipe 52 and generates a "tailpipe" air fuel signal $\lambda_{TP\text{-}CC1}$. The designations "feedgas" and "tailpipe" are used herein for reference only and are not intended to impart any meaning regarding location of sensors 54, 56 or other sensors discussed hereinbelow except as follows: (i) the term "feedgas" indicates that the particular sensor is located in the exhaust gas stream of engine 10 upstream of any emission control device; (ii) the term "tailpipe" indicates that the particular sensor is located in the exhaust gas stream of engine 10 downstream of at least one emission control device.

ECU 58 is provided to control engine 10. ECU 58 may comprise a programmable microprocessor or microcontroller or may comprise an application specific integrated circuit (ASIC). ECU 58 may include a central processing unit (CPU) 60 and an input/output (I/O) interface 62. Through interface 62, ECU 58 may receive a plurality of input signals including signals generated by oxygen sensors 54, 56 and conventional sensors such as a profile ignition pickup (PIP) sensor 64, a temperature sensor 66, a cylinder identification (CID) sensor (not shown), an air temperature sensor (not shown), a mass air flow (MAF) sensor 68, a manifold absolute pressure (MAP) sensor 70, and a temperature sensor (not shown) for device 12. Also through interface 62, ECU 58 may generate a plurality of output signals including one or more signals used to control fuel injectors 30, spark plugs 32, and EGR valve 50. ECU 58 may also include one or more memories including, for example, Read Only Memory (ROM) 72, Random Access Memory (RAM) 74, and a Keep Alive Memory (KAM) 76 to retain information when the ignition key is turned off.

Figure 2:
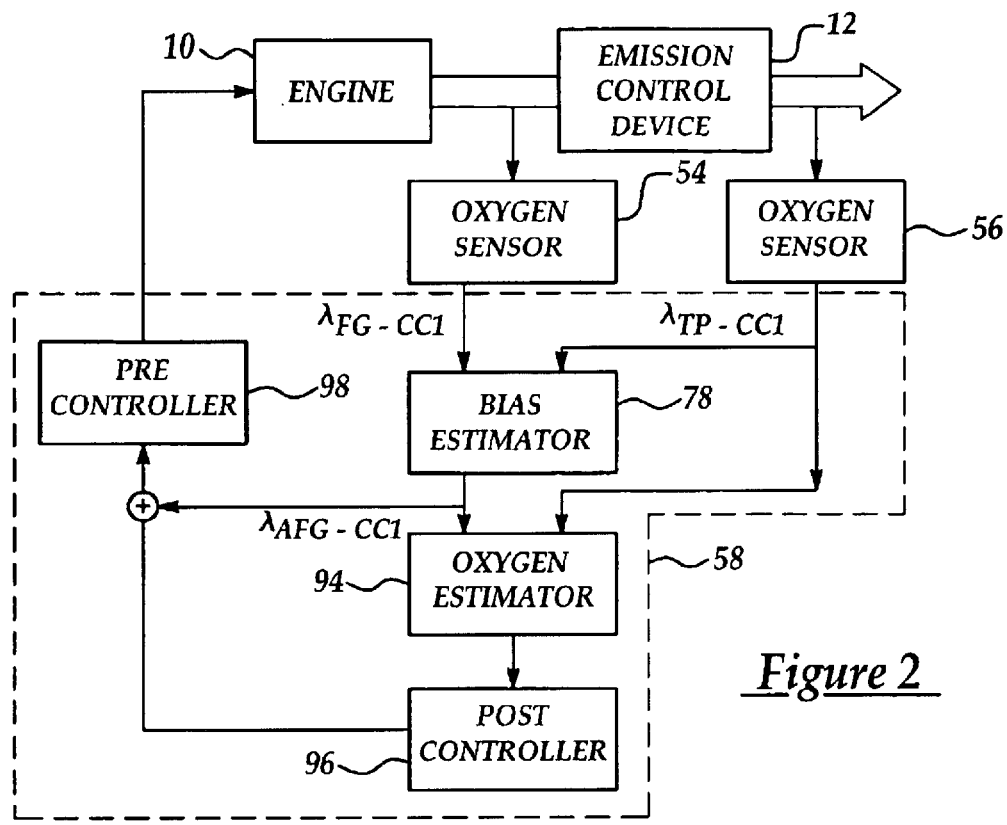
FIG. 2 is a block diagram illustrating a system and method for controlling an engine in accordance with a first embodiment of the present invention. (see also page 17)

Referring now to FIG. 2 a method in accordance with one embodiment of the present invention for controlling engine 10 will be described in detail. The inventive method or algorithm may be implemented by system 14 wherein ECU 58 is configured to perform several steps of the method by programming instruction or code (i.e., software). The instructions may be encoded on a computer storage medium such as a conventional diskette or CD-ROM and may be copied into one of memories 72, 74, 76 of ECU 58 using conventional computing devices and methods.

The inventive method may begin with the steps of receiving a feedgas air fuel signal $\lambda_{FG\text{-}CC1}$ from an oxygen sensor, sensor 54, disposed in an exhaust gas stream of engine 10 upstream of emission control device 12. The method may continue with the step of receiving a tailpipe air fuel signal $\lambda_{TP\text{-}CC1}$ from an oxygen sensor, sensor 56, disposed in the exhaust gas stream of engine 10 downstream of device 12.

Referring again to FIG. 2, the method may continue with the step of obtaining an adjusted feedgas air fuel ratio $\lambda_{AFG\text{-}CC1}$ responsive to the feedgas air fuel signal $\lambda_{FG\text{-}CC1}$ and the tailpipe air fuel signal $\lambda_{TP\text{-}CC1}$. The adjusted feedgas air fuel ratio $\lambda_{AFG\text{-}CC1}$ reflects a correction of feedgas air fuel signal $\lambda_{FG\text{-}CC1}$ to account for non-equilibrium effects in the exhaust gas of engine 10 in estimating the air fuel mixture in cylinder 16. The adjusted feedgas air fuel ratio $\lambda_{AFG\text{-}CC1}$ is used for more accurate control of engine 10. In accordance with the present invention, however, the adjusted feedgas air fuel ratio $\lambda_{AFG\text{-}CC1}$ is also used to render a more accurate estimation of the oxygen storage level in device 12 which in turn increases the accuracy of engine control system 12.

Figure 3:
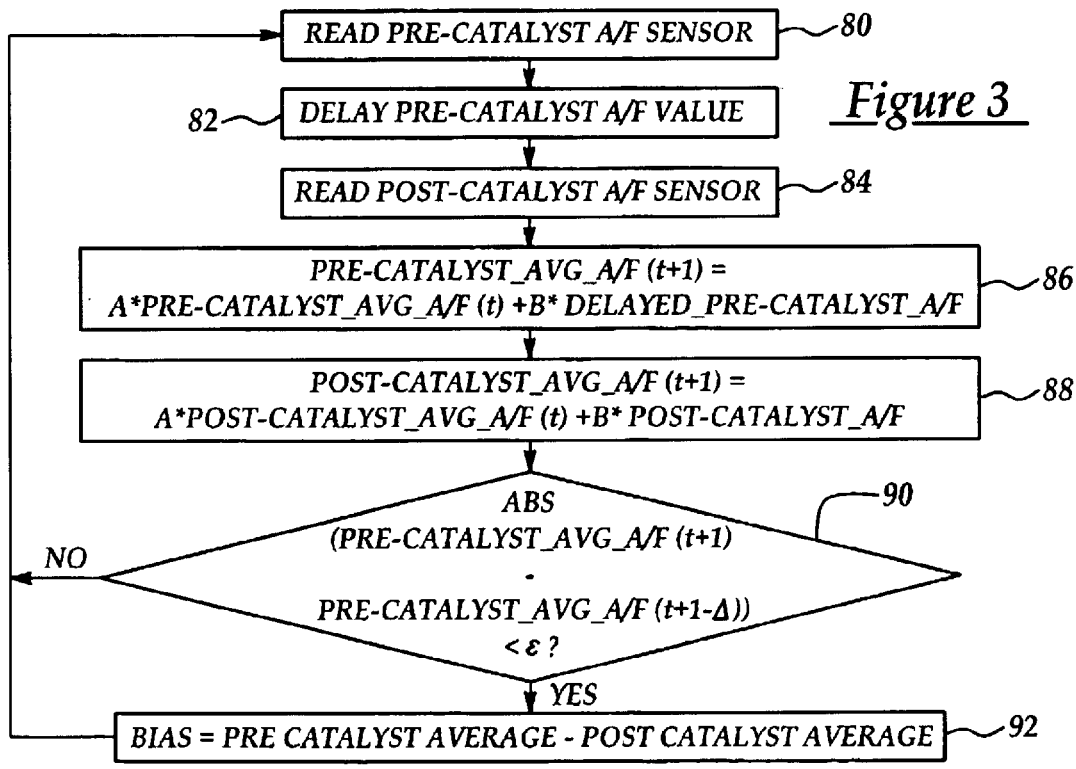
FIG. 3 is a flow chart diagram illustrating a method for adjusting the air fuel ratio indicated by an oxygen sensor in accordance with one aspect of the present invention.

The step of obtaining adjusted feedgas air fuel ratio $\lambda_{AFG\text{-}CC1}$ may be implemented in system 14 by configuring ECU 58 in an appropriate manner as illustrated by the block 78 designated "Bias Estimator." Referring now to FIG. 3, in accordance with one aspect of the present invention, the substeps and components used to perform this step may themselves form a novel system and method (hereinafter "Bias Estimation System" and "Bias Estimation Method," respectively). The Bias Estimation System may again include sensors 54, 56 and an appropriately configured ECU 58 to implement the steps of the Bias Estimation Method.

The Bias Estimation Method may begin with the step 80 of receiving the feedgas air fuel signal $\lambda_{FG\text{-}CC1}$ from sensor 54. The Bias Estimation Method may then continue with the step 82 or storing the air fuel value indicated by signal $\lambda_{FG\text{-}CC1}$ for a predetermined "transport delay" period timed relative to the anticipated transport time of the exhaust gas stream through device 12. Step 82 may be implemented in software using a conventional first-in, first-out (FIFO) data structure or other conventional arrangement. The Bias Estimation Method may continue with the step 84 of receiving tailpipe air fuel signal $\lambda_{TP\text{-}CC1}$ from sensor 56 and the steps 86, 88 of determining average feedgas and tailpipe air fuel ratios in the exhaust gas stream before and after device 12 over time as indicated by sensors 54, 56. The average feedgas air fuel ratio may be derived as follows:

Pre-catalyst_Avg_A/F(t+1)=A*Pre-catalyst_Avg_A/F(t)+ B*Delayed_Pre-catalyst_A/F where A and B are predetermined constants, Pre-catalyst_Avg_A/F(t) is the most recently determined average air fuel ratio for sensor 54 and Delayed_Pre-catalyst_A/F is a previously received air fuel ratio value as delayed by the transport delay referred to above. The average tailpipe air fuel ratio may be derived as follows:

Post-catalyst_Avg_A/F(t+1)=A*Post-catalyst_Avg_A/F(t)+ B*Post-catalyst_A/F where A and B are predetermined constants, Post-catalyst_Avg_A/F(t) is the most recently determined average air fuel ratio for sensor 56 and Post-catalyst_A/F is the most recently determined air-fuel ratio value obtained from sensor 56. The Bias Estimation Method may continue with the step 90 of comparing the average feedgas air fuel ratio and the previous value for the average feedgas air fuel ratio. This comparison results in a difference value which may then itself be compared as follows against a predetermined value $\epsilon$ indicative of a steady state mode of operation for engine 10:

$$ABS[\text{Pre-catalyst\_Avg\_A/F}(t+1)-(\text{Pre-catalyst\_Avg\_A/F}(t+1-\Delta))]$$
$$<\epsilon$$

If the comparison reveals that engine 10 is operating in a steady state operational mode, the Bias Estimation Method concludes with the step 92 of calculating a bias by subtracting the average tailpipe air fuel ratio from the average feedgas air fuel ratio. The bias may then be applied to the feedgas air fuel ratio indicated by feedgas air signal $\lambda_{FG\text{-}CC1}$ and the resulting adjusted feedgas air fuel ratio $\lambda_{AFG\text{-}CC1}$ may be used for further control of engine 10 as indicated in FIG. 2.

Figure 4:
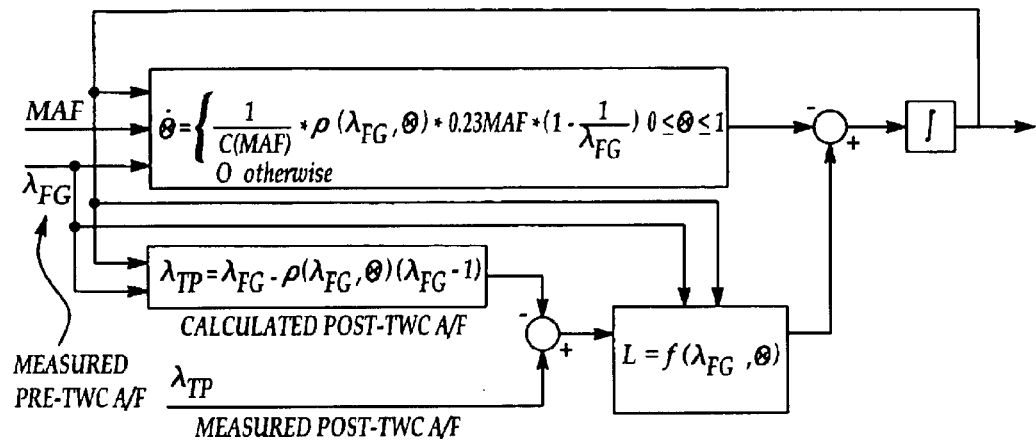
FIG. 4 is a block diagram illustrating a mathematical model for estimating the oxygen store level in an emission control device in accordance with another aspect of the present invention.

Referring again now to FIG. 2, the method for controlling engine 10 may further include the step of obtaining an estimate of an oxygen storage level in device 12 responsive to the adjusted feedgas air fuel ratio $\lambda_{AFG\text{-}CC1}$ and the tailpipe air fuel signal $\lambda_{TP\text{-}CC1}$. The step may be implemented in system 14 by configuring ECU 58 in an appropriate manner as illustrated by the block 94 designated "Oxygen Estimator." Referring to FIG. 4, estimator 94 may comprise a real-time mathematical model of device 12 functioning as a conventional observer wherein device 12 and estimator 94 are provided with the same inputs and an error is signal is formed between the respective outputs and fed back to estimator 94. The model may be described as follows:

$$\theta = \begin{cases} \frac{1}{C(MAF)} * \rho(\lambda_{FG}, \theta) * 0.23 MAF * \left(1 - \frac{1}{\lambda_{FG}}\right) & 0 \le \theta \le 1 \\ 0 & \text{otherwise} \end{cases}$$

$$\lambda_{TP} = \lambda_{FG} - \rho(\lambda_{FG}, \theta)(\lambda_{FG} - 1)$$

$$\rho(\lambda_{FG}, \theta) = \begin{cases} \alpha_L f_L(\theta) & \lambda_{FG} \le 1 \\ \alpha_R f_R(\theta) & \lambda_{FG} > 1 \end{cases}$$

$$f_L = \frac{1 - e^{6\theta}}{e^6 - 1} + 1$$

$$f_R = \frac{e^{-9\theta} - 1}{e^{-9} - 1}$$

wherein $\theta$ is the oxygen storage level in device 12, $\lambda_{FG}$ and $\lambda_{TP}$ are the measured air fuel ratios indicated by sensors 54, 56, $\rho(\lambda_{FG}, \theta)$ is a function describing the ratio of available oxygen stored in, or released from, device 12 and MAF is the mass air flow in engine 10 and C(MAF) is a function describing the oxygen storage capacity of device 12 as a function of mass air flow into device 12. The model described above is one of several known mathematical models for emission control devices. See e.g., E. P. Brandt et al. "Dynamic Modeling of a Three-Way Catalyst for SI Engine Exhaust Emission Control," IEEE Transactions on Control System Technology, Vol. 8, No. 5 (September 2000) and G. Fiengo et al. "On Board Diagnosis for Three Way Catalytic Converters," International Journal of Robust and Nonlinear Control, Vol. 11, No. 11 (September 2001), the entire disclosures of which are incorporated herein by reference. The model illustrated in FIG. 4 and described herein is based on the Brandt et al. article referred to above and comprises an Extended Kalman Filter. The Estimator 94 may filter the adjusted feedgas air fuel ratio $\lambda_{AFG\text{-}CC1}$ and the tailpipe air fuel signal $\lambda_{TP\text{-}CC1}$ to reduce noise and also provides an estimate of the uncertainty in the engine model due to injector drift or incorrect estimations of air charge. In accordance with another aspect of the present invention the illustrated model incorporates a significant inventive improvement that improves the accuracy of system 14 in controlling engine 10.

Figure 5:
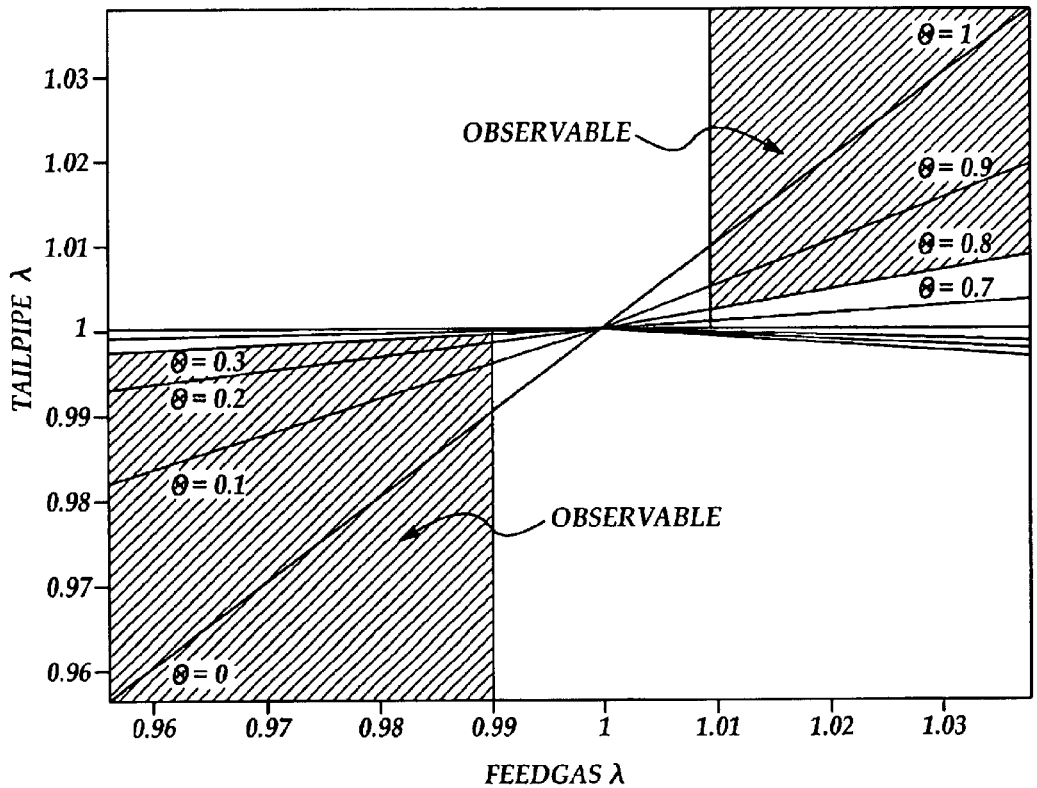
FIG. 5 is a graphical illustration of the observability of the oxygen storage level in an emission control device.

In a conventional observer, a system is said to be observable if a feedback gain (also known as an output injection in the case of an observer) can be found such that the actual output values of the physical system being studied—in this case device 12—and the estimated output value obtained from the model of that system converge. The inventors herein have recognized that the amount of oxygen stored in device 12 is not uniformly observable over the entire range of air fuel ratios and stored oxygen levels in which device 12 operates. Referring to FIG. 5, when the air fuel mixture in engine 10 is relatively rich device 12 is only observable when device 12 has relatively low oxygen storage levels. When the air fuel mixture in engine 10 is relatively lean device 12 is only observable when device 12 has relatively high oxygen storage levels Referring again to FIG. 4, in accordance with another aspect of the present invention, the feedback gain L for the oxygen storage estimate is adjusted relative to the observability of device 14. In particular, the gain is increased when device 14 is observable and the gain is reduced and/or eliminated when device 14 is not observable. The observability reflected in FIG. 5 may be incorporated into a gain table that is responsive to the adjusted feedgas air fuel ratio $\lambda_{AFG\text{-}CC1}$ and the oxygen storage estimate determined by the model. The scheduled gains may be derived by a conventional interpolation method. In addition to the adjusted feedgas air fuel ratio $\lambda_{AFG\text{-}CC1}$ and the determined oxygen storage estimate, additional inputs may be used to determine the gain.

Referring again to FIG. 2, the inventive method may conclude with the step of generating a control signal for engine 10 responsive to the adjusted feedgas air fuel ratio $\lambda_{AFG\text{-}CC1}$ and the oxygen storage level estimate for device 14. The step may be implemented in system 14 by configuring ECU 58 in an appropriate manner as illustrated by the blocks 96, 98 designated "Post Controller" and "Pre Controller," respectively.

Figure 6:
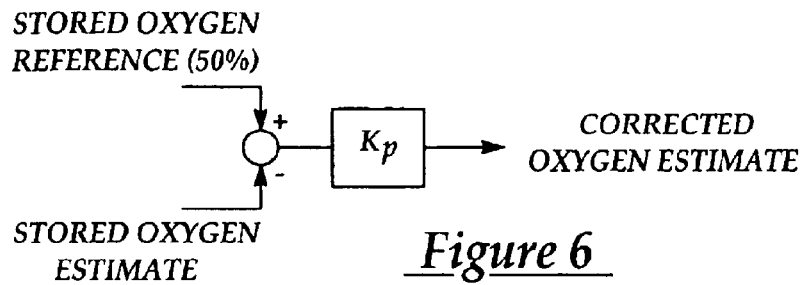
FIGS. 6–7 are block diagrams illustrating components of a system in accordance with a first embodiment of the present invention.

Referring now to FIG. 6, the Post Controller 96 may comprise a proportional controller. It should be understood, however, that other conventional controllers could alternatively be used including, for example, a linear quadratic regulator (operating when device 12 is observable) in combination with a proportional plus integral controller (operating when the observability of device 12 is reduced). The linear quadratic regulator may be implemented in a look-up table. The Post Controller 96 receives the oxygen storage level estimate for device 12 as generated by Oxygen Estimator 94 and compares the oxygen storage level estimate to a desired or reference oxygen storage level. In the illustrated embodiment, the desired oxygen storage level is 50% which allows maximum flexibility in handling both NOx emissions and HC and CO emissions. It should be understood, however, that the desired oxygen storage level could assume other values (typically between 30% and 70%) depending upon various design considerations associated with control of engine 10 and device 12. Post controller 96 generates a corrected estimate of the oxygen storage level in device 12 responsive to the oxygen storage level estimate of Oxygen Estimator 94 and the desired oxygen storage level. As in Oxygen Estimator 94, Post Controller 96 may be further configured to adjust a gain of the corrected estimate responsive to the observability of device 12. In particular, the gain may be adjusted responsive to the adjusted feedgas air fuel ratio $\lambda_{AFG\text{-}CC1}$, the oxygen storage estimate and/or other inputs.

Figure 7:
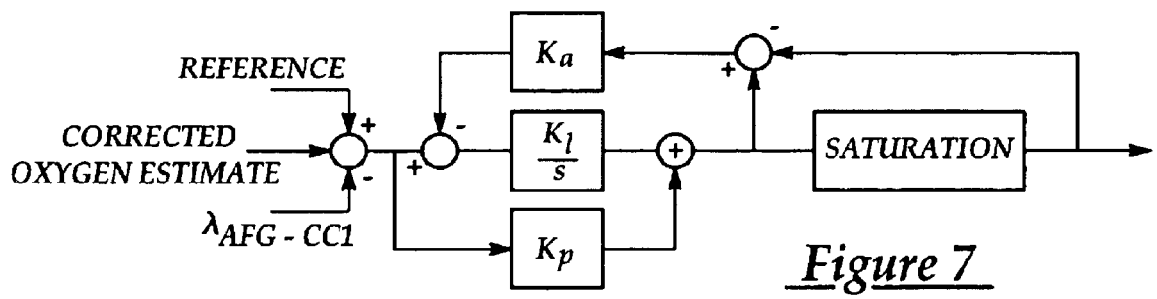

Referring now to FIG. 7, the Pre Controller 98 may comprise a proportional plus integral controller. It should be understood, however, that other conventional controllers could alternatively be used. Pre-Controller 98 receives the adjusted feedgas air fuel ratio $\lambda_{AFG\text{-}CC1}$, the corrected oxygen storage level estimate from Post-Controller 96 and a reference signal and generates a control signal for engine 10 in response thereto. Thus, Pre-Controller 98 generates a proportional signal responsive to a sum of the first adjusted feedgas air fuel ratio $\lambda_{AFG\text{-}CC1}$ and the corrected estimate of the oxygen storage level in device 12.

Figure 8:
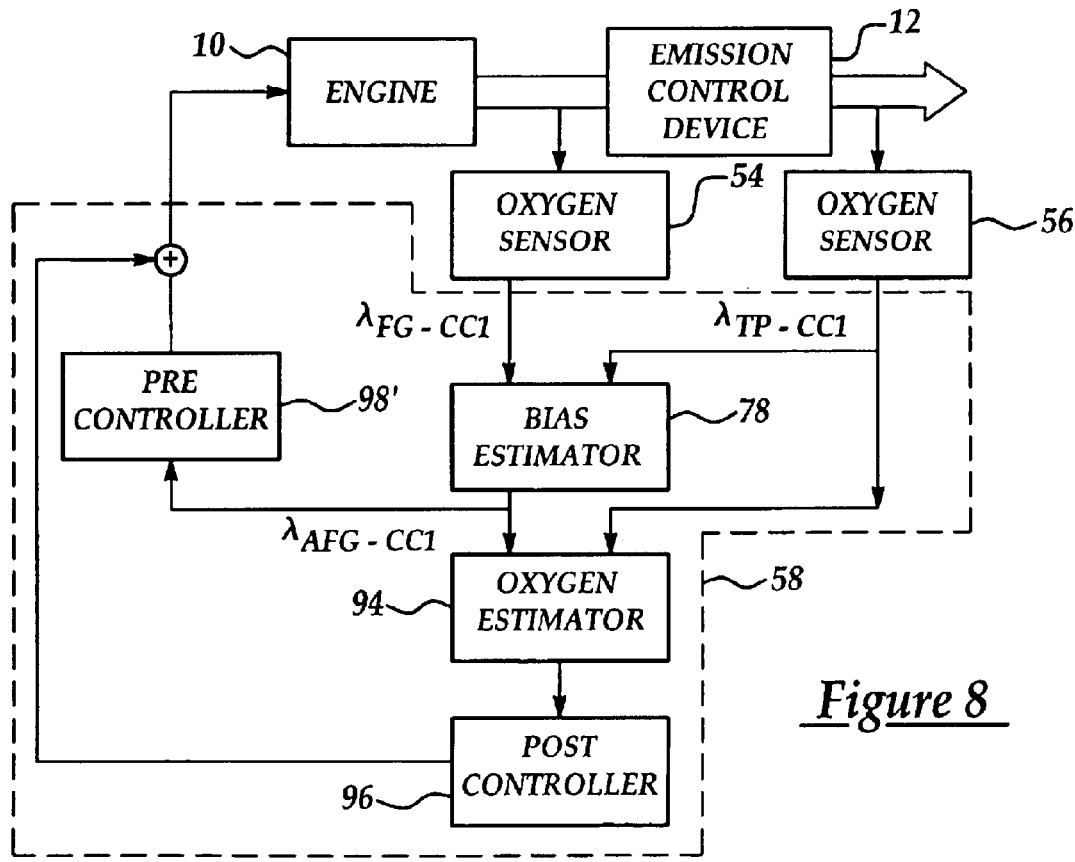
FIG. 8 is a block diagram illustrating a system and method for controlling an engine in accordance with a second embodiment of the present invention.

In the embodiment of the invention illustrated in FIG. 1, Post-Controller 96 and Pre-Controller 98 are connected in series such that the output of Post-Controller 96 forms a portion of the inputs to Pre-Controller 98. Referring now to FIG. 8, in an alternative embodiment of the invention, Post-Controller 96' and Pre-Controller 98' operate in parallel. As a result, the control signal for engine 10 may comprise the sum of the corrected estimate of the oxygen storage level in device 12 generated by Post-Controller 96' and a proportional signal generated by Pre-Controller 98' and derived from the adjusted feedgas air fuel ratio $\lambda_{AFG\text{-}CC1}$. Post-Controller 96' and Pre-Controller 98' may be substantially similar to Post-Controller 96 and Pre-Controller 98 with the exception that Pre-Controller 98' does not receive the corrected oxygen storage level estimate as an input.

Figure 9:
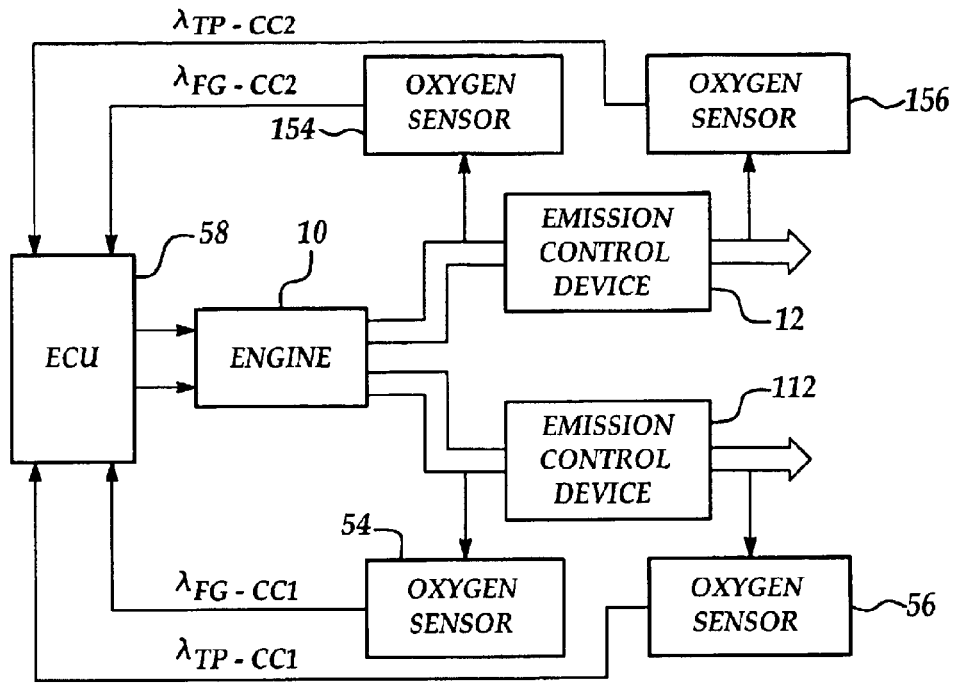
(FIG. 9 and page 23)

In the embodiments of the invention illustrated in FIGS. 2 and 8, engine 10 is controlled to achieve maximum robustness and to minimize emissions in combination with a single emission control device 12. Conventional vehicles, however, frequently employ multiple emission control devices to control emissions from engine 10. For example, one conventional engine includes multiple banks of cylinders in which the exhaust gas from each bank of cylinders is provided to a different emission control device. Referring now to FIG. 9, a system and method for controlling engine 10 in accordance with another embodiment of the invention will be described.

As illustrated in FIG. 9, a pair of emission control devices 12, 112 may be coupled to engine 10. Device 112 may be substantially similar to device 12 and is disposed in the exhaust gas stream of engine 10. A system in accordance with the illustrated embodiment of the invention, includes exhaust gas oxygen sensors 154, 156 in addition to sensors 54, 56 and ECU 58. Sensors 154, 156 may be substantially similar to sensors 54, 56. Sensor 154 is disposed in the exhaust gas stream of engine 10 upstream of device 112 and generates a feedgas air fuel signal. Sensor 156 is also disposed in the exhaust gas stream of engine 10 downstream of device 112 and generates a tailpipe air fuel signal. ECU 58 receives the signals generated by oxygen sensors 54, 56 and 154, 156 as inputs.

As discussed hereinabove, ECU 58 may be configured as shown in FIG. 2 or FIG. 8 to obtain an adjusted feedgas air fuel ratio $\lambda_{AFG\text{-}CC1}$ responsive to the feedgas air fuel signal $\lambda_{FG\text{-}CC1}$ and the tailpipe air fuel signal $\lambda_{TP\text{-}CC1}$ received from sensors 54, 56, to obtain an estimate of an oxygen storage level in device 12 responsive to the adjusted feedgas air fuel ratio $\lambda_{AFG\text{-}CC1}$ and the tailpipe air fuel signal $\lambda_{TP\text{-}CC1}$, and to generate a control signal for engine 10 responsive to the adjusted feedgas air fuel ratio $\lambda_{AFG\text{-}CC1}$ and the oxygen storage level estimate for device 12. ECU 58 may be similarly configured to obtain an adjusted feedgas air fuel ratio $\lambda_{AFG\text{-}CC2}$ responsive to the feedgas air fuel signal $\lambda_{FG\text{-}CC2}$ and the tailpipe air fuel signal $\lambda_{FG\text{-}CC2}$ received from sensors 154, 156, to obtain an estimate of an oxygen storage level in device 112 responsive to the adjusted feedgas air fuel ratio $\lambda_{AFG\text{-}CC2}$ and the tailpipe air fuel signal $\lambda_{TP\text{-}CC2}$, and to generate another control signal for engine 10 responsive to the adjusted feedgas air fuel ratio $\lambda_{AFG\text{-}CC2}$ and the oxygen storage level estimate for device 112. In this manner engine 10 may be controlled so as to achieve maximum robustness of engine 10 and to minimize emissions from one or both of devices 12, 112.

Figure 10:
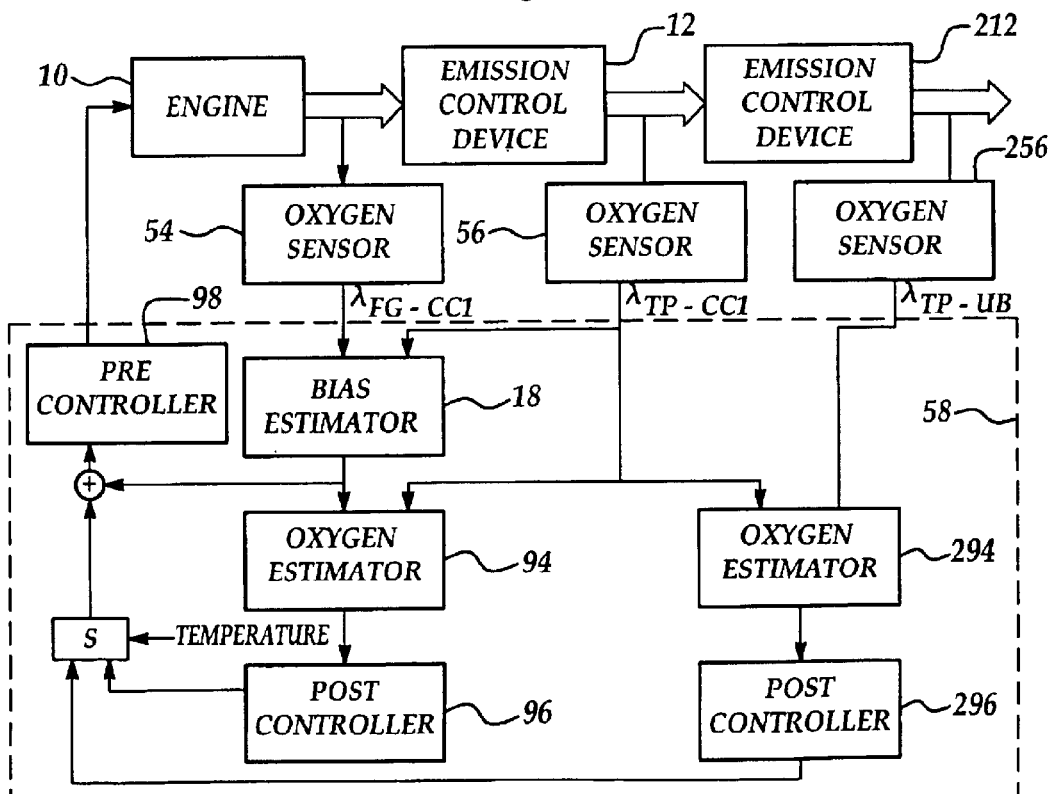
FIG. 10 is a block diagram illustrating a system and method for controlling an engine in accordance with a fourth embodiment of the present invention. (Y-Connection, parallel)

FIG. 9 illustrates an arrangement wherein multiple emission control devices 12, 112 are arranged in parallel and used to control emissions from engine 10. Referring now to FIG. 10, a system and method for controlling engine 10 in accordance with another embodiment of the invention will be described wherein multiple emission control devices 12, 212 are arranged in a conventional series relationship.

As illustrated in FIG. 10, a pair of emission control devices 12, 212 may be coupled to engine 10 in series. Device 212 may be substantially similar to device 12 and is disposed in the exhaust gas stream of engine 10. A system in accordance with the illustrated embodiment of the invention, includes exhaust gas oxygen sensors 256 in addition to sensors 54, 56 and ECU 58. Sensors 256 may be substantially similar to sensors 54, 56. Sensor 56 is disposed in the exhaust gas stream of engine 10 downstream of device 12 as in previously discussed embodiments and is also located upstream of device 212. Sensor 256 is disposed in the exhaust gas stream of engine 10 downstream of device 212 and generates a tailpipe air fuel signal $\lambda_{TP\text{-}UB}$. ECU 58 receives the signals generated by oxygen sensors 54, 56, 256 as inputs.

ECU 58 may be configured as in previously discussed embodiments, including a Bias Estimator 78, Oxygen Estimator 94, Post Controller 96 and Pre-Controller 98. In accordance with the present embodiment, however, ECU 58 may be further configured to include an Oxygen Estimator 294 and a Post Controller 296. Internally, oxygen Estimator 294 and Post Controller 296 may be substantially similar to Oxygen Estimator 94 and Post Controller 96. Oxygen Estimator 294, however, determines the oxygen storage level in device 212 responsive to tailpipe air fuel signal $\lambda_{TP\text{-}CC1}$ and tailpipe air fuel signal $\lambda_{TP\text{-}UB}$. ECU 58 may be further configured as indicated in block S to select one of the signals generated by Post-Controller 96 and Post-Controller 296 for input to Pre-Controller 98. In this manner, engine 10 is controlled so as to optimally regulate the oxygen storage level in one of devices 12, 212. The selection may be made by ECU 58 responsive to a temperature of the exhaust gas stream or another parameter. In particular, the signal generated by Post-Controller 96 may be selected during light-off and the signal generated by Post-Controller 96 may be selected once the engine has warmed so as to maximize efficiency. It should be understood that the arrangement of Post Controllers 96, 296 and Pre-Controller 98 in FIG. 10 is similar to the arrangement illustrated in FIG. 2. In other words, the control signal for engine 10 is generated by Pre-Controller 98 responsive to the sum of the adjusted feedgas air fuel ratio $\lambda_{AFG\text{-}CC1}$ and a corrected estimate, of the oxygen storage level in one of devices 12, 212 as generated by Post Controllers 96, 296. Post-Controllers 96, 296 and Pre-Controller 98 could alternatively be arranged in a manner similar to that illustrated in FIG. 8. In other words, the control signal for engine 10 may alternatively comprises a sum of the corrected estimate of the oxygen storage level in one of devices 12, 212 as generated by Post Controllers 96, 296 and a proportional signal derived from the adjusted feedgas air fuel ratio $\lambda_{AFG\text{-}CC1}$ as generated by Pre-Controller 98.

Referring now to FIG. 11, a system and method for controlling engine 10 in accordance with another embodiment of the invention will be described wherein multiple emission control devices 12, 112, 212 are arranged in a conventional Y relationship. The embodiment illustrated in FIG. 11 combines elements previously described and illustrated with respect to FIGS. 9 and 10. As illustrated in FIG. 11, a pair of emission control devices 12, 112 are coupled to engine 10 in parallel. An additional emission control device 212 is connected in series with the parallel combination of devices 12, 112. A system in accordance with the illustrated embodiment of the invention, includes exhaust gas oxygen sensors 54, 56, 154, 156 and 256 and ECU 58. ECU 58 receives the signals generated by oxygen sensors 54, 56, 154, 156, and 256 as inputs. ECU 58 may be configured as discussed hereinabove with reference to FIG. 10 (and FIGS. 2 and 8) as to each combination of a device 12, 112 and device 212.

A system and method in accordance with the present invention represents a significant improvement in engine control systems. The invention enables more accurate control by adjusting for errors commonly occurring in oxygen sensors located upstream of the emission control device and by using that adjusted value in determining the oxygen storage level estimate for the emission control device(s). The invention further accounts for the observability of the oxygen storage level in the emission control device further increasing the accuracy of the control logic.

We claim:

1. A system for controlling an engine, comprising:

a first oxygen sensor disposed in an exhaust gas stream of said engine upstream of a first emission control device, said first oxygen sensor generating a first feedgas air fuel signal;

a second oxygen sensor disposed in said exhaust gas stream of said engine downstream of said first emission control device; said second oxygen sensor generating a first tailpipe air fuel signal;

a third oxygen sensor disposed in said exhaust gas stream of said engine upstream of a second emission control device, said third oxygen sensor generating a second feedgas air fuel signal;

a fourth oxygen sensor disposed in the exhaust gas stream of said engine downstream of said second emission control device, said fourth oxygen sensor generating a second tailpipe air fuel signal; and, an electronic control unit configured to obtain a first adjusted feedgas air fuel ratio responsive to said first feedgas air fuel signal and said first tailpipe air fuel signal, to obtain an estimate of an oxygen storage level in said first emission control device responsive to said first adjusted feedgas air fuel ratio and said first tailpipe air fuel signal, and to generate first control signal for said engine responsive to said first adjusted feedgas air fuel ratio and said oxygen storage level estimate for said first emission control device, to obtain a second adjusted feedgas air fuel ratio responsive to said second feedgas air fuel signal and said second tailpipe air fuel signal, to obtain an estimate of an oxygen storage level in said second emission control device responsive to said second adjusted feedgas air fuel ratio and said second tailpipe air fuel signal, and to generate a second control signal for said engine responsive to said second adjusted feedgas air fuel ratio and said oxygen storage level estimate for said second emission control device.

2. A system for controlling an engine, comprising:

a first oxygen sensor disposed in an exhaust gas stream of said engine upstream of a first emission control device, said first oxygen sensor generating a first feedgas air fuel signal;

a second oxygen sensor disposed in said exhaust gas stream of said engine downstream of said first emission control device; said second oxygen sensor generating a first tailpipe air fuel signal; and, an electronic control unit configured to obtain a first adjusted feedgas air fuel ratio responsive to said first feedgas air fuel signal and said first tailpipe air fuel signal, to obtain an estimate of an oxygen storage level in said first emission control device responsive to said first adjusted feedgas air fuel ratio and said first tailpipe air fuel signal, and to generate a first control signal for said engine responsive to said first adjusted feedgas air fuel ratio and said oxygen storage level estimate for said first emission control device wherein said electronic control unit is further configured, in obtaining said first adjusted feedgas air fuel ratio, to determine an average feedgas air fuel ratio, to determine an average tailpipe air fuel ratio, to compare said average feedgas air fuel ratio and a previously determined average feedgas air fuel ratio, and to calculate a bias comprising a difference between said average feedgas air fuel ratio and said average tailpipe air fuel ratio when said comparison indicates said engine is in a steady state operation mode.

3. The system of claim 2 wherein said electronic control unit is further configured, in obtaining said estimate of an oxygen storage level in said first emission control device, to adjust a gain of a signal indicative of said oxygen storage level estimate responsive to said first adjusted feedgas air fuel ratio.

4. The system of claim 2 wherein said electronic control unit is further configured, in generating said first control signal, to generate a corrected estimate of said oxygen storage level in said first emission control device responsive to said oxygen storage level estimate for said first emission control device and a desired oxygen storage level for said first emission control device.

5. The system of claim 4 wherein said electronic control unit is further configured, in generating said first control signal, to adjust a gain of a signal indicative of said corrected estimate responsive to said adjusted feedgas air fuel ratio.

6. The system of claim 4 wherein said first control signal is a proportional signal responsive to a sum of said first adjusted feedgas air fuel ratio and said corrected estimate of said oxygen storage level in said first emission control device.

7. The system of claim 4 wherein said first control signal is a sum of said corrected estimate of said oxygen storage level in said first emission control device and a proportional signal derived from said first adjusted feedgas air fuel ratio.

8. The system of claim 2 wherein said first control signal is used to control a fuel injector of said engine.

9. A system for controlling an engine, comprising:

a first oxygen sensor disposed in an exhaust gas stream of said engine upstream of a first emission control device, said first oxygen sensor generating a first feedgas air fuel signal;

a second oxygen sensor disposed in said exhaust gas stream of said engine downstream of said first emission control device; said second oxygen sensor generating a first tailpipe air fuel signal;

a third oxygen sensor disposed in said exhaust gas stream of said engine downstream of a second emission control device, said second emission control device downstream of said first emission control device and said third oxygen sensor generating a second tailpipe air fuel signal; and, a fourth oxygen sensor disposed in said exhaust gas stream of said engine upstream of a third emission control device, said fourth oxygen sensor generating a second feedgas air fuel signal;

a fifth oxygen sensor disposed in said exhaust gas stream of said engine downstream of said third emission control device and upstream of said second emission control device; said fifth oxygen sensor generating a third tailpipe air fuel signal;

an electronic control unit configured to obtain a first adjusted feedgas air fuel ratio responsive to said first feedgas air fuel signal and said first tailpipe air fuel signal, to obtain an estimate of an oxygen storage level in said first emission control device responsive to said first adjusted feedgas air fuel ratio and said first tailpipe air fuel signal, to obtain an estimate of an oxygen storage level in said second emission control device responsive to said first tailpipe air fuel and said second tailpipe air fuel signal, and to generate a first control signal for said engine responsive to said first adjusted feedgas air fuel ratio and one of said oxygen storage level estimate for said first emission control device and said oxygen storage level estimate for said second emission control device, to obtain a second adjusted feedgas air fuel ratio responsive to said second feedgas air fuel signal and said third tailpipe air fuel signal, to obtain an estimate of an oxygen storage level in said third emission control device responsive to said second adjusted air fuel ratio and said third tailpipe air fuel signal, and to generate a second control signal for said engine responsive to said second adjusted feedgas air fuel ratio and one of said oxygen storage level estimate for said third emission control device and said oxygen storage level estimate for said second emission control device.

10. A system for controlling an engine, comprising:

a first oxygen sensor disposed in an exhaust gas stream of said engine upstream of a first emission control device, said first oxygen sensor generating a first feedgas air fuel signal;

a second oxygen sensor disposed in said exhaust gas stream of said engine downstream of said first emission control device; said second oxygen sensor generating a first tailpipe air fuel signal;

a third oxygen sensor disposed in said exhaust gas stream of said engine downstream of a second emission control device, said second emission control device downstream of said first emission control device and said third oxygen sensor generating a second tailpipe air fuel signal; and, an electronic control unit configured to obtain a first adjusted feedgas air fuel ratio responsive to said first feedgas air fuel signal and said first tailpipe air fuel signal, to obtain an estimate of an oxygen storage level in said first emission control device responsive to said first adjusted feedgas air fuel ratio and said first tailpipe air fuel signal, to obtain an estimate of an oxygen storage level in said second emission control device responsive to said first tailpipe air fuel signal and said second tailpipe air fuel signal, and to generate a first control signal for said engine responsive to said first adjusted feedgas air fuel ratio and one of said oxygen storage level estimate for said first emission control device and said oxygen storage level estimate for said second emission control device wherein said electronic control unit is further configured, in obtaining said first adjusted feedgas air fuel ratio, to determine an average feedgas air fuel ratio, to determine an average tailpipe air fuel ratio, to compare said average feedgas air fuel ratio and a previously determined average feedgas air fuel ratio, and to calculate a bias comprising a difference between said average feedgas air fuel ratio and said average tailpipe air fuel ratio when said comparison indicates said engine is in a steady state operation mode.

11. The system of claim 10 wherein said electronic control unit is further configured, in generating said first control signal, to select said one oxygen storage level estimate responsive to a temperature of the engine.

12. The system of claim 10 wherein said electronic control unit is further configured, in obtaining said estimate of an oxygen storage level in said first emission control device, to adjust a gain of a signal indicative of said oxygen storage level estimate responsive to said first a adjusted feedgas air fuel ratio.

13. The system of claim 10 wherein said electronic control unit is further configured, in generating said first control signal, to generate a corrected estimate of said oxygen storage level in said first emission control device responsive to said oxygen storage level estimate for said first emission control device and a desired oxygen storage level for said first emission control device.

14. The system of claim 13 wherein said electronic control unit is further configured, in generating said first control signal, to adjust a gain of a signal indicative of said corrected estimate responsive to said adjusted feedgas air fuel ratio.

15. The system of claim 13 wherein said first control signal is a proportional signal responsive to a sum of said first adjusted feedgas air fuel ratio and said corrected estimate of said oxygen storage level in said first emission control device.

16. The system of claim 13 wherein said first control signal is a sum of said corrected estimate of said oxygen storage level in said first emission control device and a proportional signal derived from said first adjusted feedgas air fuel ratio.

17. The system of claim 10 wherein said first control signal is used to control a fuel injector of said engine.

18. A method for controlling an engine, comprising the steps of:

receiving a first feedgas air fuel signal from a first oxygen sensor disposed in an exhaust gas stream of said engine upstream of a first emission control device;

receiving a first tailpipe air fuel signal from a second oxygen sensor disposed in said exhaust gas stream of said engine downstream of said first emission control device;

obtaining a first adjusted feedgas air fuel ratio responsive to said first feedgas air fuel signal and said first tailpipe air fuel signal;

obtaining an estimate of an oxygen storage level in said first emission control device responsive to said first adjusted feedgas air fuel ratio and said first tailpipe air fuel signal;

generating a first control signal for said engine responsive to said first adjusted feedgas air fuel ratio and said oxygen storage level estimate for said first emission control device;

receiving a second feedgas air fuel signal from a third oxygen sensor disposed in said exhaust gas stream of said engine upstream of a second emission control device;

receiving a second tailpipe air fuel signal from a fourth oxygen sensor disposed in the exhaust gas stream of said engine downstream of said second emission control device;

obtaining a second adjusted feedgas air fuel ratio responsive to said second feedgas air fuel signal and said second tailpipe air fuel signal;

obtaining an estimate of an oxygen storage level in said second emission control device responsive to said second adjusted feedgas air fuel ratio and said second tailpipe air fuel signal; and, generating a second control signal for said engine responsive to said second adjusted feedgas air fuel ratio and said oxygen storage level estimate for said second emission control device.

19. A method for controlling an engine, comprising the steps of:

receiving a first feedgas air fuel signal from a first oxygen sensor disposed in an exhaust gas stream of said engine upstream of a first emission control device;

receiving a first tailpipe air fuel signal from a second oxygen sensor disposed in said exhaust gas stream of said engine downstream of said first emission control device;

obtaining a first adjusted feedgas air fuel ratio responsive to said first feedgas air fuel signal and said first tailpipe air fuel signal;

obtaining an estimate of an oxygen storage level in said first emission control device responsive to said first adjusted feedgas air fuel ratio and said first tailpipe air fuel signal;

generating a first control signal for said engine responsive to said first adjusted feedgas air fuel ratio and said oxygen storage level estimate for said first emission control device;

wherein said step of obtaining said first adjusted feedgas air fuel ratio includes the substeps of:

determining an average feedgas air fuel ratio;

determining an average tailpipe air fuel ratio;

comparing said average feedgas air fuel ratio and a previously determined average feedgas air fuel ratio; and calculating a bias comprising a difference between said average feedgas air fuel ratio and said average tailpipe air fuel ratio when said comparison indicates said engine is in a steady state operation mode.

20. The method of claim 19 wherein said step of obtaining said estimate of an oxygen storage level in said first emission control device includes the substep of adjusting a gain of a signal indicative of said oxygen storage level estimate responsive to said first adjusted feedgas air fuel ratio.

21. The method of claim 19 wherein said step of generating said first control signal includes the substep of generating a corrected estimate of said oxygen storage level in said first emission control device responsive to said oxygen storage level estimate for said first emission control device and a desired oxygen storage level for said first emission control device.

22. The method of claim 21 wherein said step of generating said first control signal further includes the substep of adjusting a gain of a signal indicative of said corrected estimate responsive to said adjusted feedgas air fuel ratio.

23. The method of claim 21 wherein said first control signal is a proportional signal responsive to a sum of said first adjusted feedgas air fuel ratio and said corrected estimate of said oxygen storage level in said first emission control device.

24. The method of claim 21 wherein sad first control signal is a sum of said corrected estimate of said oxygen storage level in said first emission control device and proportional signal derived from said first adjusted feedgas air fuel ratio.

25. The method of claim 21 wherein said first control signal is used to control a fuel injector of said engine.

26. A method for controlling an engine, comprising the steps of:

receiving a first feedgas air fuel signal from a first oxygen sensor disposed in an exhaust gas stream of said engine upstream of a first emission control device;

receiving a first tailpipe air fuel signal from a second oxygen sensor disposed in said exhaust gas stream of said engine downstream of said first emission control device;

receiving a second tailpipe air fuel signal from a third oxygen sensor disposed in said exhaust gas stream of said engine downstream of a second emission control device, said second emission control device downstream of said first emission control device;

obtaining a first adjusted feedgas air fuel ratio responsive to said first feedgas air fuel signal and said first tailpipe air fuel signal;

obtaining an estimate of an oxygen storage level in said first emission control device responsive to said first adjusted feedgas air fuel ratio and said first tailpipe air fuel signal;

obtaining an estimate of an oxygen storage level in said second emission control device responsive to said first tailpipe air fuel signal and said second tailpipe air fuel signal; and, generating a first control signal for said engine responsive to said first adjusted feedgas air fuel ratio and one of said oxygen storage level estimate for said first emission control device and said oxygen storage level estimate for said second emission control device receiving a second feedgas air fuel signal from a fourth oxygen sensor disposed in said exhaust gas stream of said engine upstream of a third emission control device;

receiving a third tailpipe air fuel signal from a fifth oxygen sensor disposed in said exhaust gas stream of said engine downstream of said third emission control device and upstream of said second emission control device;

obtaining a second adjusted feedgas air fuel ratio responsive to said second feedgas air fuel signal and said third tailpipe air fuel signal;

obtaining an estimate of an oxygen storage level in said third emission control device responsive to said second adjusted air fuel ratio and said third tailpipe air fuel signal; and, generating a second control signal for said engine responsive to said second adjusted feedgas air fuel ratio and one of said oxygen storage level estimate for said third emission control device and said oxygen storage level estimate for said second emission control device.

27. A method for controlling an engine, comprising the steps of:

receiving a first feedgas air fuel signal from a first oxygen sensor disposed in an exhaust gas stream of said engine upstream of a first emission control device;

receiving a first tailpipe air fuel signal from a second oxygen sensor disposed in said exhaust gas stream of said engine downstream of said first emission control device;

receiving a second tailpipe air fuel signal from a third oxygen sensor disposed in said exhaust gas stream of said engine downstream of a second emission control device, said second emission control device downstream of said first emission control device;

obtaining a first adjusted feedgas air fuel ratio responsive to said first feedgas air fuel signal and said first tailpipe air fuel signal;

obtaining an estimate of an oxygen storage level in said first emission control device responsive to said first adjusted feedgas air fuel ratio and said first tailpipe air fuel signal;

obtaining an estimate of an oxygen storage level in said second emission control device responsive to said first tailpipe air fuel signal and said second tailpipe air fuel signal; and, generating a first control signal for said engine responsive to said first adjusted feedgas air fuel ratio and one of said oxygen storage level estimate for said first emission control device and said oxygen storage level estimate for said second emission control device wherein said step of obtaining said first adjusted feedgas air fuel ratio includes the substeps of:

determining an average feedgas air fuel ratio;

determining an average tailpipe air fuel ratio;

comparing said average feedgas air fuel ratio and a previously determined average feedgas air fuel ratio; and calculating a bias comprising a difference between said average feedgas air fuel ratio and said average tailpipe air fuel ratio when said comparison indicates said engine is in a steady state operation mode.

28. The method of claim 27 wherein said step of generating said first control signal includes the substep of select said one oxygen storage level estimate responsive to a temperature of the engine.

29. The method of claim 27 wherein said step of obtaining said estimate of an oxygen storage level in said first emission control device includes the substep of adjusting a gain of a signal indicative of said oxygen storage level estimate responsive to said first adjusted feedgas air fuel ratio.

30. The method of claim 27 wherein said step of generating said first control signal includes the substep of generating a corrected estimate of said oxygen storage level in said first emission control device responsive to said oxygen storage level estimate for said first emission control device and a desired oxygen storage level for said first emission control device.

31. The method of claim 30 wherein said step of generating said first control signal further includes the substep of adjusting a gain of a signal indicative of said corrected estimate responsive to said adjusted feedgas air fuel ratio.

32. The method of claim 30 wherein said first control signal is a proportional signal responsive to a sum of said first adjusted feedgas air fuel ratio and said corrected estimate of said oxygen storage level in said first emission control device.

33. The method of claim 30 wherein said first control signal is a sum of said corrected estimate of said oxygen storage level in said first emission control device and a proportional signal derived from said first adjusted feedgas air fuel ratio.

34. The method of claim 27 wherein said first control signal is used to control a fuel injector of said engine.

35. An article of manufacture, comprising:
a computer storage medium having a computer program encoded thereon for controlling an engine, said computer program including code for:
receiving a first feedgas air fuel signal from a first oxygen sensor disposed in an exhaust gas stream of said engine upstream of a first emission control device;
receiving a first tailpipe air fuel signal from a second oxygen sensor disposed in said exhaust gas stream of said engine downstream of said first emission control device;
obtaining a first adjusted feedgas air fuel ratio responsive to said first feedgas air fuel signal and said first tailpipe air fuel signal;
obtaining an estimate of an oxygen storage level in said first emission control device responsive to said first adjusted feedgas air fuel ratio and said first tailpipe air fuel signal;
generating a first control signal for said engine responsive to said first adjusted feedgas air fuel ratio and said oxygen storage level estimate for said first emission control device
receiving a second feedgas air fuel signal from a third oxygen sensor disposed in said exhaust gas stream of said engine upstream of a second emission control device;
receiving a second tailpipe air fuel signal from a fourth oxygen sensor disposed in the exhaust gas stream of said engine downstream of said second emission control device;
obtaining a second adjusted feedgas air fuel ratio responsive to said second feedgas air fuel signal and said second tailpipe air fuel signal;
obtaining an estimate of an oxygen storage level in said second emission control device responsive to said second adjusted feedgas air fuel ratio and said second tailpipe air fuel signal; and,
generating a second control signal for said engine responsive to said second adjusted feedgas air fuel ratio and said oxygen storage level estimate for said second emission control device.

36. An article of manufacture, comprising:
a computer storage medium having a computer program encoded thereon for controlling an engine, said computer program including code for:
receiving a first feedgas air fuel signal from a first oxygen sensor disposed in an exhaust gas stream of said engine upstream of a first emission control device;
receiving a first tailpipe air fuel signal from a second oxygen sensor disposed in said exhaust gas stream of said engine downstream of said first emission control device;
obtaining a first adjusted feedgas air fuel ratio responsive to said first feedgas air fuel signal and said first tailpipe air fuel signal;
obtaining an estimate of an oxygen storage level in said first emission control device responsive to said first adjusted feedgas air fuel ratio and said first tailpipe air fuel signal;
generating a first control signal for said engine responsive to said first adjusted feedgas air fuel ratio and said oxygen storage level estimate for said first emission control device
wherein said code for obtaining said first adjusted feedgas air fuel ratio includes the code for:
determining an average feedgas air fuel ratio;
determining an average tailpipe air fuel ratio;
comparing said average feedgas air fuel ratio and a previously determined average feedgas air fuel ratio; and,
calculating a bias comprising a difference between said average feedgas air fuel ratio and said average tailpipe air fuel ratio when said comparison indicates said engine is in a steady state operation mode.

37. The article of manufacture of claim 36 wherein said code for obtaining said estimate of an oxygen storage level in said first emission control device includes code for adjusting a gain of a signal indicative of said oxygen storage level estimate responsive to said first adjusted feedgas air fuel ratio.

38. The article of manufacture of claim 36 said code for generating said first control signal includes code for generating a corrected estimate of said oxygen storage level in said first emission control device responsive to said oxygen storage level estimate for said first emission control device and a desired oxygen storage level for said first emission control device.

39. The article of manufacture of claim 38 wherein said code for generating said first control signal further includes code for adjusting a gain of a signal in indicative of said corrected estimate responsive to said adjusted feedgas air fuel ratio.

40. The article of manufacture of claim 38 wherein said first control signal is a proportional signal responsive to a sum of said first adjusted feedgas air fuel ratio and said corrected estimate of said oxygen storage level in said first emission control device.

41. The article of manufacture of claim 38 wherein said first control signal is a sum of said corrected estimate of said oxygen storage level in said first emission control device and a proportional signal derived from said first adjusted feedgas air fuel ratio.

42. The article of manufacture of claim 36 wherein said first control signal is used to control a fuel injector of said engine.

43. An article of manufacture, comprising:
a computer storage medium having a computer program encoded thereon for controlling an engine, said computer program including code for:
receiving a first feedgas air fuel signal from a first oxygen sensor disposed in an exhaust gas stream of said engine upstream of a first emission control device;
receiving a first tailpipe air fuel signal from a second oxygen sensor disposed in said exhaust gas stream of said engine downstream of said first emission control device;
receiving a second tailpipe air fuel signal from a third oxygen sensor disposed in said exhaust gas stream of said engine downstream of a second emission control device, said second emission control device downstream of said first emission control device;

obtaining a first adjusted feedgas air fuel ratio responsive to said first feedgas air fuel signal and said first tailpipe air fuel signal;

obtaining an estimate of an oxygen storage level in said first emission control device responsive to said first adjusted feedgas air fuel ratio and said first tailpipe air fuel signal;

obtaining an estimate of an oxygen storage level in said second emission control device responsive to said first tailpipe air fuel signal and said second tailpipe air fuel signal; and, generating a first control signal for said engine responsive to said first adjusted feedgas air fuel ratio and one of said oxygen storage level estimate for said first emission control device and said oxygen storage level estimate for said second emission control device receiving a second feedgas air fuel signal from a fourth oxygen sensor disposed in said exhaust gas stream of said engine upstream of a third emission control device;

receiving a third tailpipe air fuel signal from a fifth oxygen sensor disposed in said exhaust gas stream of said engine downstream of said third emission control device and upstream of said second emission control device;

obtaining a second adjusted feedgas air fuel ratio responsive to said second feedgas air fuel signal and said third tailpipe air fuel signal;

obtaining an estimate of an oxygen storage level in said third emission control device responsive to said second adjusted air fuel ratio and said third tailpipe air fuel signal; and, generating a second control signal for said engine responsive to said second adjusted feedgas air fuel ratio and one of said oxygen storage level estimate for said third emission control device and said oxygen storage level estimate for said second emission control device.

44. An article of manufacture, comprising:

a computer storage medium having a computer program encoded thereon for controlling an engine, said computer program including code for:

receiving a first feedgas air fuel signal from a first oxygen sensor disposed in an exhaust gas stream of said engine upstream of a first emission control device;

receiving a first tailpipe air fuel signal from a second oxygen sensor disposed in said exhaust gas stream of said engine downstream of said first emission control device;

receiving a second tailpipe air fuel signal from a third oxygen sensor disposed in said exhaust gas stream of said engine downstream of a second emission control device, said second emission control device downstream of said first emission control device;

obtaining a first adjusted feedgas air fuel ratio responsive to said first feedgas air fuel signal and said first tailpipe air fuel signal;

obtaining an estimate of an oxygen storage level in said first emission control device responsive to said first adjusted feedgas air fuel ratio and said first tailpipe air fuel signal;

obtaining an estimate of an oxygen storage level in said second emission control device responsive to said first tailpipe air fuel signal and said second tailpipe air fuel signal; and, generating a first control signal for said engine responsive to said first adjusted feedgas air fuel ratio and one of said oxygen storage level estimate for said first emission control device and said oxygen storage level estimate for said second emission control device wherein said code for obtaining said first adjusted feedgas air fuel ratio includes code for:

determining an average feedgas air fuel ratio;

determining an average tailpipe air fuel ratio;

comparing said average feedgas air fuel ratio and a previously determined average feedgas air fuel ratio; and, calculating a bias comprising a difference between said average feedgas air fuel ratio and said average tailpipe air fuel ratio when said comparison indicates said engine is in a steady state operation mode.

45. The article of manufacture of claim 44 wherein said code for generating said first control signal includes code for selecting said one oxygen storage level estimate responsive to a temperature of the engine.

46. The article of manufacture of claim 44 wherein said code for obtaining an estimate of an oxygen storage level in said first emission control device includes code for adjusting a gain of a signal indicative of said oxygen storage level estimate responsive to said first adjusted feedgas air fuel ratio.

47. The article of manufacture of claim 44 wherein said code for generating said first control signal includes code for generating a corrected estimate of said oxygen storage level in said first emission control device responsive to said oxygen storage level estimate for said first emission control device and a desired oxygen storage level for said first emission control device.

48. The article of manufacture of claim 47 wherein said code for generating said first control signal further includes code for adjusting a gain of a signal indicative of said corrected estimate responsive to said adjusted feedgas air fuel ratio.

49. The article of manufacture of claim 47 wherein said first control signal is a proportional signal responsive to a sum of said first adjusted feedgas air fuel ratio and said corrected estimate of said oxygen storage level in said first emission control device.

50. The article of manufacture of claim 47 wherein said first control signal is a sum of said corrected estimate of said oxygen storage level in said first emission control device and a proportional signal derived from said first adjusted feedgas air fuel ratio.

51. The article of manufacture of claim 44 wherein said first control signal is used to control a fuel injector of said engine.

* * * * *